(12) United States Patent
Arita et al.

(10) Patent No.: US 8,015,885 B2
(45) Date of Patent: Sep. 13, 2011

(54) TORQUE DETECTOR

(75) Inventors: Keizo Arita, Yamatokoriyama (JP); Shingo Takayama, Kashiwara (JP); Kazuyuki Yoshida, Kariya (JP)

(73) Assignee: JTEKT Corporation, Osaka (JP)

( * ) Notice: Subject to any disclaimer, the term of this patent is extended or adjusted under 35 U.S.C. 154(b) by 163 days.

(21) Appl. No.: 12/450,474

(22) PCT Filed: Mar. 28, 2008

(86) PCT No.: PCT/JP2008/056159
§ 371 (c)(1), (2), (4) Date: Sep. 28, 2009

(87) PCT Pub. No.: WO2008/120739
PCT Pub. Date: Oct. 9, 2008

(65) Prior Publication Data
US 2010/0071481 A1 Mar. 25, 2010

(30) Foreign Application Priority Data

Mar. 29, 2007 (JP) .................. 2007-087971
Mar. 30, 2007 (JP) .................. 2007-093386

(51) Int. Cl.
*G01L 3/00* (2006.01)

(52) U.S. Cl. ................................ 73/862.333
(58) Field of Classification Search .......... 73/862.331–862.338
See application file for complete search history.

(56) References Cited

U.S. PATENT DOCUMENTS 5,274,292 A * 12/1993 Lemmer et al. ............... 310/233
7,568,400 B2 * 8/2009 Tokumoto et al. ........ 73/862.333
7,845,244 B2 * 12/2010 Aoki et al. ............... 73/862.335
2004/0060766 A1 4/2004 Hayakawa et al.
2005/0223820 A1 10/2005 Murakami et al.

FOREIGN PATENT DOCUMENTS

JP 2004-101277 A 4/2004
JP 2005-300267 A 10/2005
JP 2006-071326 A 3/2006

* cited by examiner

*Primary Examiner* — Lisa M Caputo
*Assistant Examiner* — Octavia Davis
(74) *Attorney, Agent, or Firm* — Rabin & Berdo, PC (57) ABSTRACT

A torque detector (16) is provided with first and second units (38, 39). The first unit (38) includes a first synthetic resin (40) formed by molding a pair of magnetic flux collector rings (34A, 34B). The second unit (39) includes a second synthetic resin (41) fixed to a magnetic shield plate (37B) containing a metal; an insertion protruding part (44) arranged on the synthetic resin (41); and magnetic sensors (35A, 35B) held by the insertion protruding part (44). The first synthetic resin (40) includes a receiving plate (38*a*) whereupon a base (38*e*) for receiving the magnetic shield plate (37B) is formed. In a status where the receiving plate (38*a*) exists between the magnetic shield plate (37B) and an object (30) to be attached, both the magnetic shield plate (37B) and the receiving plate (38*a*) are fastened to the object (30) by a pair of fixing screws (32).

9 Claims, 8 Drawing Sheets

TORQUE DETECTOR

BACKGROUND OF THE INVENTION

1. Field of the Invention

The present invention relates to torque detectors.

2. Description of Related Arts

Torque detectors have, for example: an input shaft and an output shaft coupled coaxially through a torsion bar; a permanent magnet fixed to the input shaft; multiple magnetic yokes each formed of a soft magnetic body to be arranged within the magnetic field of the permanent magnet to form a magnetic circuit and fixed to the output shaft; a pair of magnetic flux collector rings for inducing magnetic fluxes from the magnetic yokes; and magnetic sensors for detecting magnetic fluxes induced by the magnetic flux collector rings. The pair of magnetic flux collector rings each have nail pieces arranged in such a manner as to face each other. The magnetic sensors are provided between the respective pair of nail pieces (refer to Patent Document 1 for example).

Patent Document 1: Japanese Published Unexamined Patent Application No. 2004-101277

DISCLOSURE OF THE INVENTION

Problems to be Solved by the Invention

Meanwhile, such a torque detector may be applied to electric power steering devices in automobiles. This requires ease in the work of parts replacement and an increased degree of freedom in designing.

In addition, external magnetism may have an adverse effect on the magnetic sensors. To prevent this, it has been considered to provide a magnetic shield plate in the unit above, which would disadvantageously result in an increase in the number of parts.

Means for Solving the Problems

It is an object of the present invention to provide a torque detector that can suppress the adverse effects of external magnetism with a reduced number of parts.

In order to achieve the foregoing object, a preferable aspect of the present invention provides a torque detector for detecting torque through detection of a magnetic flux variation that occurs in a pair of soft magnetic bodies arranged within the magnetic field of a permanent magnet. The torque detector includes first and second units and a pair of fixing screws for fastening the first and second units to an object in which the units are to be installed. The first unit includes a pair of magnetic flux collector rings coupled magnetically to the respective pair of soft magnetic bodies and a first synthetic resin formed by molding the pair of magnetic flux collector rings. The second unit includes a magnetic shield plate containing metal, a second synthetic resin fixed to the magnetic shield plate, an insertion protruding part arranged on a portion of the second synthetic resin in such a manner as to protrude from the magnetic shield plate, and a magnetic sensor held within the insertion protruding part. The first synthetic resin includes a receiving plate on which a base for receiving the magnetic shield plate is formed. The pair of magnetic flux collector rings include at least one pair of magnetic flux collector bosses arranged in such a manner as to face each other. The magnetic sensor held within the insertion protruding part is inserted into an insertion recessed portion formed between the magnetic flux collector bosses. The pair of fixing screws are spaced from each other, and the insertion protruding part is arranged between the pair of fixing screws. In a state where the receiving plate exists between the magnetic shield plate and the object in which the units are installed, the magnetic shield plate and the receiving plate are fastened together to the object in which the units are installed using the pair of fixing screws.

In accordance with the present aspect, since the magnetic shield plate and the receiving plate are fastened together to the object in which the units are installed using the pair of fixing screws, the number of parts can be reduced, resulting in a reduction in production cost. Also, the magnetic shield plate can make the torque detector suppress the effects of external magnetism.

BEST MODE FOR CARRYING OUT THE INVENTION

Embodiments of the present invention will hereinafter be described in detail with reference to the accompanying drawings. The present embodiment will be described for the case where a torque detector is applied to an electric power steering device in an automobile, but the torque detector may be applied to various devices and equipment other than electric power steering devices.

Figure 1:
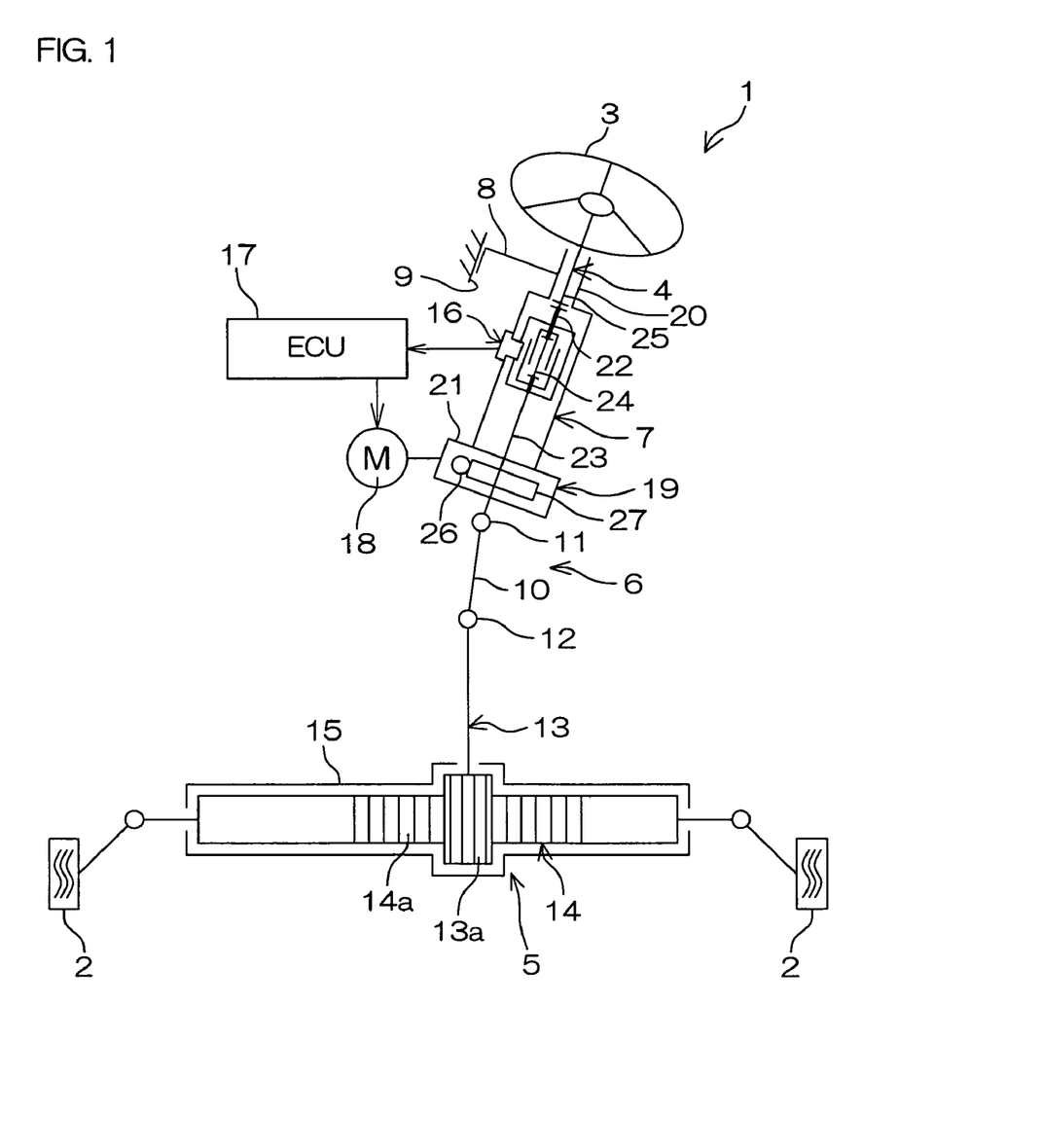
FIG. 1 is a schematic configuration diagram of an electric power steering device to which a torque detector according to an embodiment of the present invention is applied.

FIG. 1 is a schematic configuration diagram of an electric power steering device to which a torque detector according to an embodiment of the present invention is applied. Referring to FIG. 1, the electric power steering device 1 has a steering shaft 4 for transmitting steering torque applied to a steering wheel 3 as a steering member to steer steerable wheels 2 and a steering mechanism 5 composed of, for example, a rack-and-pinion mechanism for steering the steerable wheels 2 based on the steering torque from the steering shaft 4. The electric power steering device 1 also has an intermediate shaft unit 6 as a shaft coupling provided between the steering shaft 4 and the steering mechanism 5 to transmit rotation between the steering shaft 4 and the steering mechanism 5.

The steering shaft 4 is supported rotatably by a steering column 7. The steering column 7 is supported on an automobile body 9 via a bracket 8. One end of the steering shaft 4 is connected with the steering wheel 3. The other end of the steering shaft 4 is connected with the intermediate shaft unit 6. The intermediate shaft unit 6 has a power transmission shaft 10 as an intermediate shaft and universal couplings 11 and 12.

The steering mechanism 5 has a pinion shaft 13, a rack bar 14 as a steering shaft extending in the lateral direction (in the direction perpendicular to the straight travel direction) of the automobile, and a rack housing 15 supporting the pinion shaft 13 and the rack bar 14. Pinion teeth 13a of the pinion shaft 13 and rack teeth 14a of the rack bar 14 are engaged with each other. The ends of the rack bar 14 are coupled to the respective steerable wheels 2 via a tie rod and a knuckle arm (not shown in the drawing).

When the steering wheel 3 is steered, the steering torque is transmitted to the steering mechanism 5 via the steering shaft 4 and the intermediate shaft unit 6, so that the steerable wheels 2 are accordingly steered.

The electric power steering device 1 can obtain a steering assist force according to steering torque. That is, the electric power steering device 1 has a torque detector 16 for detecting steering torque, an ECU (Electronic Control Unit) 17 as a controller, an electric motor 18 for steering assist, and a reducer 19 as a gear device. In the present embodiment, the torque detector 16, electric motor 18, and reducer 19 are provided in association with the steering column 7.

The steering column 7 has a column tube 20 and a housing 21. The housing 21 houses and supports at least apart of the torque detector 16, supports the electric motor 18, and constitutes a part of the reducer 19.

The steering shaft 4 has an input shaft 22, an output shaft 23, and a torsion bar 24 as axially lower portions as well as a connecting shaft 25 as an axially upper portion. The input shaft 22 and the output shaft 23 are coupled to each other on the same axis line via the torsion bar 24. The input shaft 22 is linked to the steering wheel 3 via the connecting shaft 25. The output shaft 23 is linked to the intermediate shaft unit 6. When steering torque is input to the input shaft 22, the torsion bar 24 is elastically and torsionally deformed to accordingly cause the input shaft 22 and the output shaft 23 to rotate relatively.

The torque detector 16 is provided in association with the torsion bar 24 of the steering shaft 4 and is adapted to detect torque based on the relative amount of rotational displacement between the input shaft 22 and the output shaft 23 on either end of the torsion bar 24. The detected torque is given to the ECU 17.

The ECU 17 is adapted to control the electric motor 18 based on, for example, the detected torque and a detected vehicle speed from a speed sensor not shown in the drawing. The reducer 19 has a worm shaft 26 to be driven by the electric motor 18 and a worm wheel 27 to be engaged therewith. The worm wheel 27 and the output shaft 23 are fixed to each other to be rotated in an integrated manner.

When the steering wheel 3 is operated, steering torque is detected by the torque detector 16, and the electric motor 18 generates a steering assist force according to, for example, the detected torque and a detected vehicle speed. The steering assist force is transmitted to the steering mechanism 5 via the reducer 19. At the same time, the operation of the steering wheel 3 is also transmitted to the steering mechanism 5. As a result, the steerable wheels 2 are steered and the steering is assisted.

Figure 2:
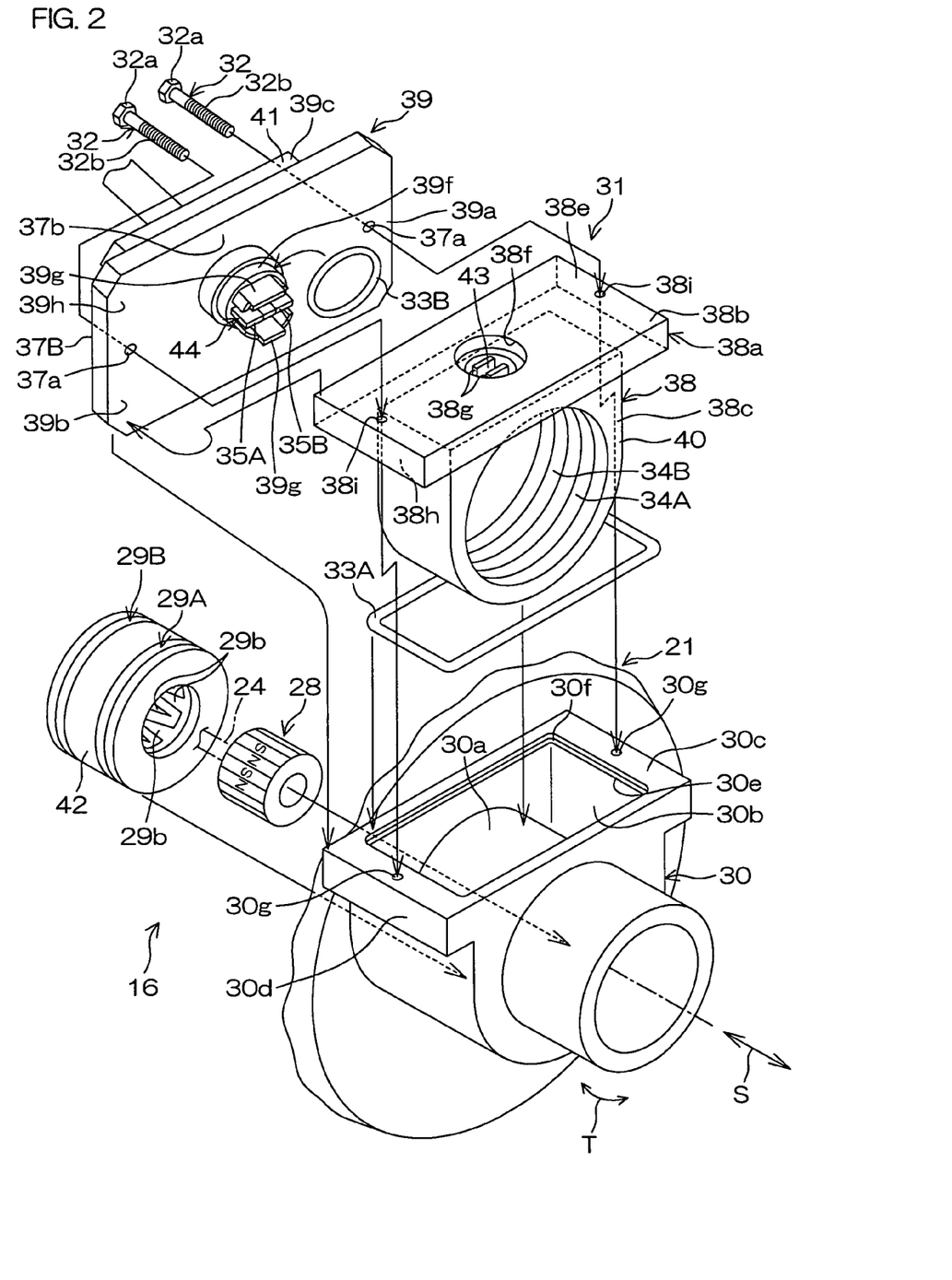
FIG. 2 is an exploded perspective view of the torque detector shown in FIG. 1.
Figure 3:
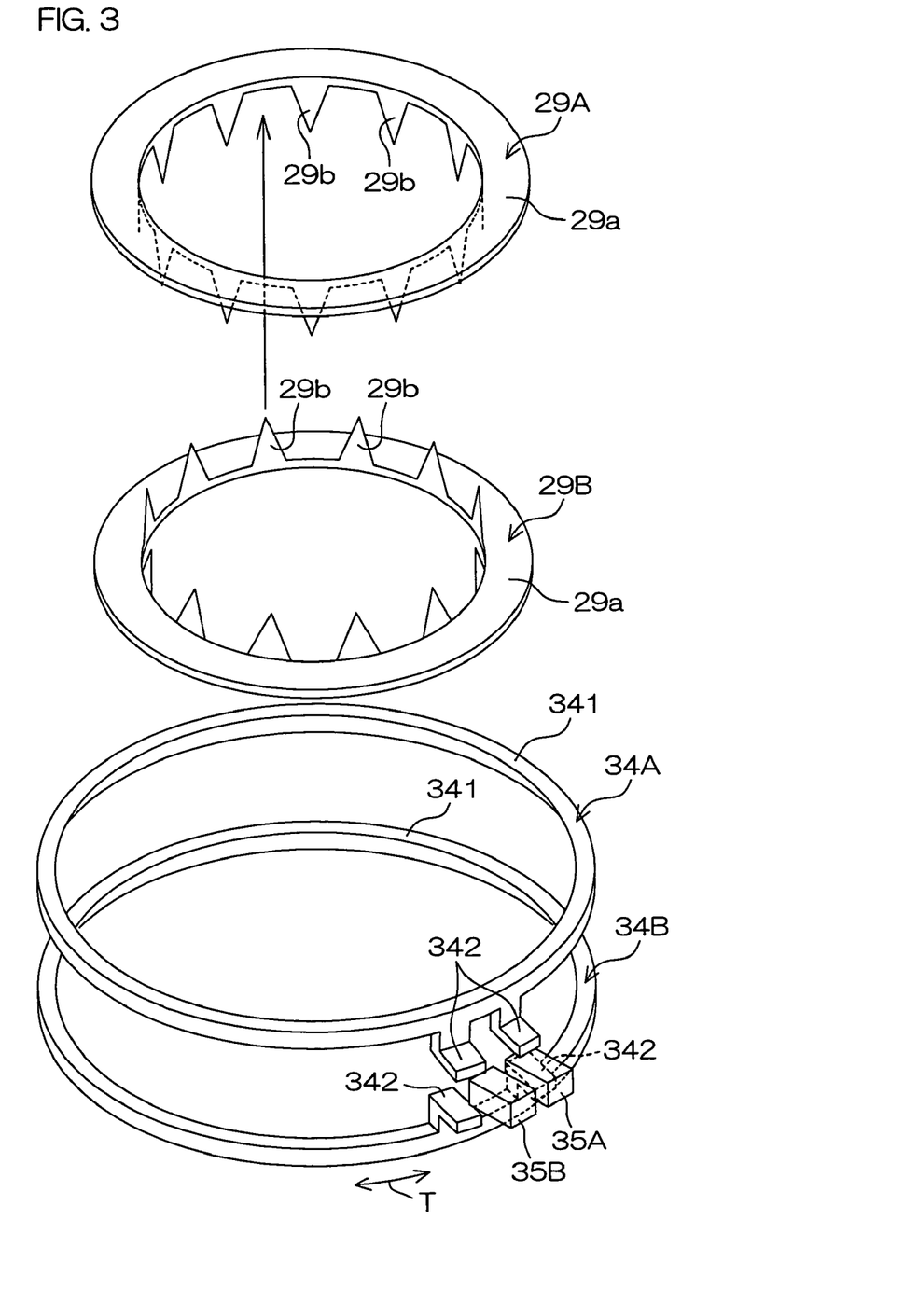
FIG. 3 is an exploded perspective view of a substantial part of the torque detector in FIG. 2.
Figure 4:
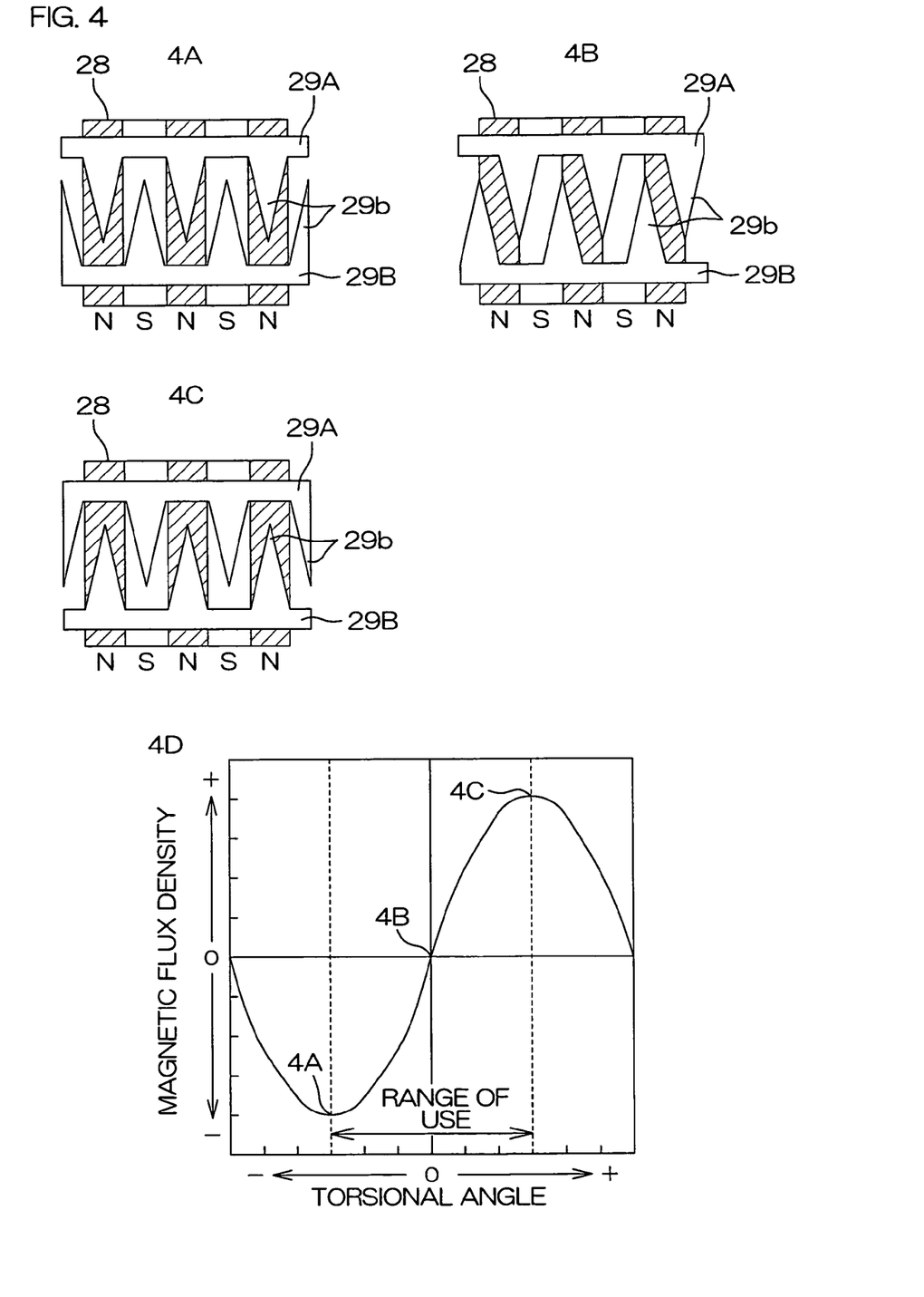
FIGS. 4A to 4C are illustrative views showing an operation of the torque detector in FIG. 2.
FIG. 4D is a graph showing the relationship between the torsional angle existing between input and output shafts and the magnetic flux density.
Figure 5:
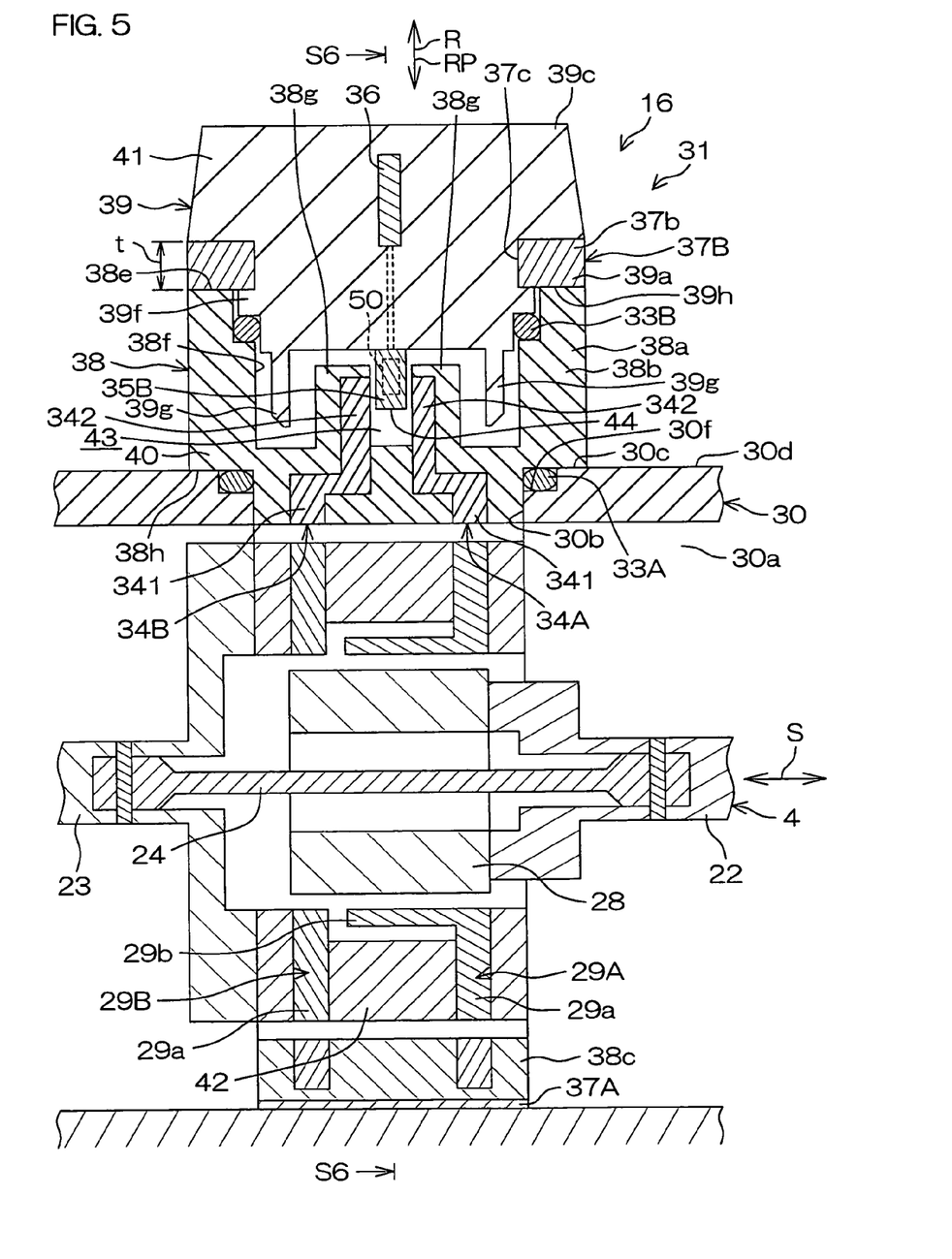
FIG. 5 is a cross-sectional view of the torque detector in FIG. 2, corresponding to the cross section along the line S5-S5 in FIG. 6.
Figure 6:
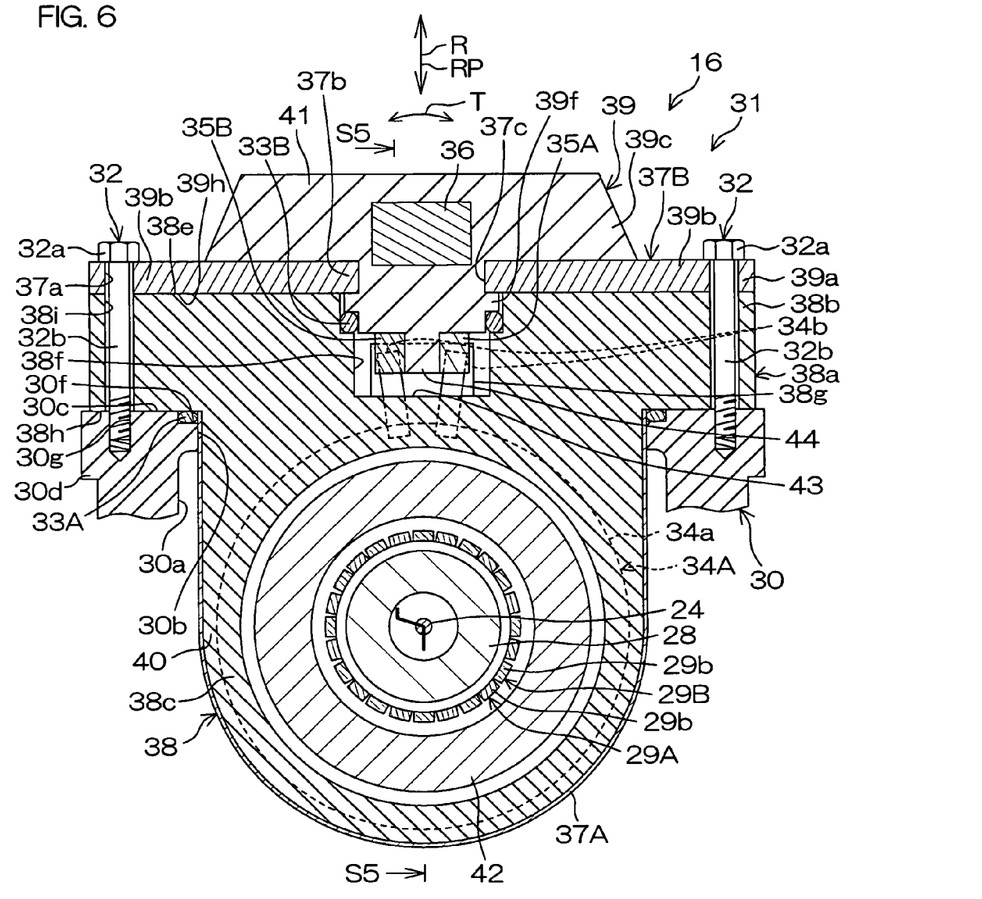
FIG. 6 is a cross-sectional view along the line S6-S6 in FIG. 5.

FIG. 2 is an exploded perspective view of the torque detector 16 shown in FIG. 1. FIG. 3 is an exploded perspective view of a substantial part of the torque detector 16 in FIG. 2. FIGS. 4A to 4C are illustrative views showing an operation of the torque detector 16 in FIG. 2, and FIG. 4D is a graph showing the relationship between the torsional angle existing between the input shaft 22 and the output shaft 23 and the magnetic flux density. FIG. 5 is a cross-sectional view of the torque detector 16 in FIG. 2, corresponding to the cross section along the line S5-S5 in FIG. 6. FIG. 6 is a cross-sectional view along the line S6-S6 in FIG. 5.

Referring to FIGS. 2, 5, and 6, the torque detector 16 according to the present embodiment has the input shaft 22, output shaft 23, and torsion bar 24, and also has a permanent magnet 28 and a pair of magnetic yokes 29A and 29B as soft magnetic bodies that are magnetic circuit members constituting a magnetic circuit, the magnetic flux of which varies according to torque applied to the members 22, 23, and 24.

The torque detector 16 further has a sensor housing 30 as an object in which the units are installed, a fixing side unit 31 installed in the sensor housing 30, and two fixing screws 32 as fixing members for fixing the fixing side unit 31 to the sensor housing 30. The fixing screws 32 are spaced from each other. The torque detector 16 also has an annular sealing member 33A for sealing between the sensor housing 30 and the fixing side unit 31 and an annular sealing member 33B for sealing within the fixing side unit 31.

The input shaft 22, output shaft 23, torsion bar 24, permanent magnet 28, and the pair of magnetic yokes 29A and 29B constitute a movable part of the torque detector 16, while the sensor housing 30 and the fixing side unit 31 constitute a fixed part of the torque detector 16.

The sensor housing 30 has a cylindrical shape as a portion of the housing 21 and has an interior cavity 30a. The sensor housing 30 has side portions 30d that constitute the outer periphery of the housing and each have a communication hole 30b for communication between inside and outside. The side portions 30d are formed with an installation opening 30e for the communication hole and a mounting surface 30c for mounting the fixing side unit 31 thereon.

The mounting surface 30c is formed in an annular flat shape surrounding the installation opening 30e. The inside and outside contours of the flat surface each has an approximately rectangular shape extending in the direction perpendicular to the axial direction S when viewed in the radial direction R. The mounting surface 30c is formed with an annular stepped portion 30f for housing the sealing member 33A along the edge portion of the installation opening 30e and two screw holes 30g for receiving the fixing screws 32. The screw holes 30g are independent of the cavity 30a of the sensor housing 30 and formed in a bottomed shape with a predetermined depth. It is noted that the mounting surface 30c may be formed on another member (not shown in the drawings) fixed to the sensor housing 30.

The fixing side unit 31 has a pair of magnetic flux collector rings 34A and 34B as auxiliary soft magnetic bodies, two magnetic sensors 35A and 35B for detecting magnetic fluxes induced by the pair of magnetic flux collector rings 34A and 34B, a circuit board 36 including a power supply section and a signal processing section, and metal magnetic shield plates 37A and 37B for suppressing the adverse effect of external magnetism on the inside of the fixing side unit 31. The fixing side unit 31 also has first and second units 38 and 39 coupled to each other.

In the following descriptions, the axial direction S, radial direction R, and circumferential direction T of the steering shaft 4 are simply referred to also as axial direction S, radial direction R, and circumferential direction T. These axial, radial, and circumferential directions S, R, and T are also the axial, radial, and circumferential directions of the input shaft 22, output shaft 23, permanent magnet 28, magnetic yokes 29A and 29B, and magnetic flux collector rings 34A and 34B. One radial direction R in which the first and second units 38 and 39 of the fixing side unit 31 are coupled to each other is referred to as coupling direction RP.

The first unit 38 has the pair of magnetic flux collector rings 34A and 34B as magnetic circuit members in the fixing side unit 31 and the magnetic shield plate 37A. The first unit 38 is formed by molding the members 34A, 34B, and 37A integrally with a first synthetic resin 40 as an insulator.

The first unit 38 also has a receiving plate 38a arranged nearer the second unit 39 with respect to the coupling direction RP and an annular portion 38c arranged within the sensor housing 30 through the communication hole 30b. The receiving plate 38a is formed as a portion of the first synthetic resin 40 in a rectangular shape arranged in parallel with the axial direction S. The four edge portions of the receiving plate 38a constitute a flange 38b protruding from the annular portion 38c. The flange 38b has a dimension greater than that of the installation opening 30e of the communication hole 30b in the sensor housing 30 and is formed as a portion of the first synthetic resin 40.

The second unit 39 has the magnetic sensors 35A and 35B and the circuit board 36 as electric circuit members and the magnetic shield plate 37B. The members 35A, 35B, 36, and 37B are molded integrally with a second synthetic resin 41 as an insulator and fixed to the second unit 39 when the second synthetic resin 41 is molded. That is, the magnetic shield plate 37B is fixed to the second synthetic resin 41 as a result of an injection molding process for the synthetic resin 41.

The second unit 39 also has a main body portion 39c, a flange 39b, and an end portion 39a arranged nearer the first unit 38 with respect to the coupling direction RP.

The magnetic shield plate 37B is made of hard metal and may use a steel plate as a magnetic material. Alternatively, high-permeability materials such as permalloy, amorphous, silicon steel, and pure iron may be used. The magnetic shield plate 37B is formed in the same shape and size as the receiving plate 38a of the first unit 38 when viewed in the coupling direction RP to cover the receiving plate 38a of the first unit 38.

The magnetic shield plate 37B has a shape following that of a base 38e as a magnetic shield plate mounting portion. This shape is, for example, a flat plate-like one covering the base 38e in a planar contact manner.

The magnetic shield plate 37B also has screw insertion holes 37a penetrating in the coupling direction RP and a through hole 37c penetrating at the central portion 37b of the magnetic shield plate 37B. The second synthetic resin 41 is formed in such a manner as to partially penetrate through the through hole 37c.

The second synthetic resin 41 is partially arranged outside and on either side of the through hole 37c in the coupling direction RP and lies next to the through hole 37c to have a diameter greater than that of the through hole 37c. The magnetic shield plate 37B is also formed at a thickness "t" of, for example, 2 to 4 mm with which the plate cannot be deformed by axial forces it may be received when the fixing screws 32 are screwed and fitted.

The main body portion 39c is formed by molding the magnetic sensors 35A and 35B, circuit board 36, and the central portion 37b as a portion of the magnetic shield plate 37B integrally with the second synthetic resin 41.

The flange 39b is provided on either side of the main body portion 39c in an extended manner. The flange 39b is entirely formed of the magnetic shield plate 37B and has the above-described two screw insertion holes 37a. The two screw insertion holes 37a are arranged on either side of the main body portion 39c.

The permanent magnet 28 and the pair of magnetic yokes 29A and 29B are housed in the sensor housing 30. Also, the first and second units 38 and 39 are arranged side by side and coupled to each other along the radial direction R of the steering shaft 4. The first unit 38 is arranged at the relatively inner side in the radial direction of the steering shaft 4 through the installation opening 30e of the communication hole 30b in the sensor housing 30. The magnetic flux collector rings 34A and 34B of the annular portion 38c as a portion of the first unit 38 protrude inside the sensor housing 30. The second unit 39 is arranged at the relatively outer side in the radial direction of the steering shaft 4 and outside the sensor housing 30.

In the present embodiment, the flange 38b of the receiving plate 38a in the first unit 38 is mounted on the mounting surface 30c of the sensor housing 30, and the flange 39b in the second unit 39 is mounted threadably on the mounting surface 30c of the sensor housing 30 using the two fixing screws 32 via the flange 38b in the first unit 38. The fixing screws 32 fasten together the flange 38b in the first unit 38 and the flange 39b in the second unit 39.

Referring to FIGS. 2 and 5, the permanent magnet 28 has a cylindrical shape and is fixed to the input shaft 22 coaxially in an integrally rotational manner. On the outer periphery of the permanent magnet 28, multiple magnetic poles, e.g. 24 poles (12 poles respectively for N and S), are magnetized at equal spaces in the circumferential direction T.

The magnetic yokes 29A and 29B each have a cylindrical shape and contactlessly surround the permanent magnet 28 externally in the radial direction to be arranged within the magnetic field of the permanent magnet 28 and thereby to be coupled magnetically to the permanent magnet 28. The pair of magnetic yokes 29A and 29B are fixed contactlessly to each other in a relatively immovable manner and also fixed to the output shaft 23 coaxially in an integrally rotational manner. The pair of magnetic yokes 29A and 29B are arranged in such a manner that when the relative position between the magnetic yokes 29A and 29B and the permanent magnet 28 varies with respect to the circumferential direction T, the magnetic flux density in the magnetic circuit formed of the magnetic yokes 29A and 29B and the permanent magnet 28 also varies.

Referring to FIGS. 2, 3, and 5, the magnetic yokes 29A and 29B each have an annular disk-shaped ring 29a and multiple (e.g. 12 pieces of) nails 29b rising at equal spaces from the inner periphery of the ring 29a. The rings 29a of the two magnetic yokes 29A and 29B are arranged coaxially in a mutually facing manner at a predetermined spacing therebetween in the axial direction S. The nails 29b of the two magnetic yokes 29A and 29B protrude in such a manner as to come close to each other in the axial direction S and are arranged evenly one after the other in the circumferential direction T. In this state, the two magnetic yokes 29A and 29B are formed by molding integrally with the synthetic resin 42. The molding has a cylindrical shape.

Referring to FIGS. 3, 5, and 6, the two magnetic flux collector rings 34A and 34B are coupled magnetically to the respective magnetic yokes 29A and 29B to introduce magnetic fluxes from the respective magnetic yokes 29A and 29B into the respective magnetic sensors 35A and 35B. The two magnetic flux collector rings 34A and 34B each have an annular shape to coaxially and contactlessly surround the respective magnetic yokes 29A and 29B externally in the radial direction.

The magnetic flux collector rings 34A and 34B each have an annular main body portion 341 and a pair of nail pieces 342 as a pair of magnetic flux collector bosses extending outward in the radial direction from the main body portion 341. The two nail pieces 342 are of the same shape and spaced from each other in the circumferential direction T. The two magnetic flux collector rings 34A and 34B are fixed contactlessly to each other in the following manner. One nail piece 342 of one magnetic flux collector ring 34A and one nail piece 342 of the other magnetic flux collector ring 34B make a pair to extend in such a manner as to come close to each other and to face each other along the axial direction S. Similarly, the other nail piece 342 of the one magnetic flux collector ring 34A and the other nail piece 342 of the other magnetic flux collector ring 34B also make a pair. A predetermined amount of clearance in the axial direction S is opened between the pair of nail pieces 342 as an insertion recessed portion 43. In this state, the pair of magnetic flux collector rings 34A and 34B are integrated by molding with the first synthetic resin 40. The magnetic flux collector rings 34A and 34B are coupled magnetically to each other via the nail pieces 342.

The pair of magnetic sensors 35A and 35B are arranged side by side in the circumferential direction T. As shown in FIG. 5, the magnetic sensors 35A and 35B are each composed of a hall IC including a hall element as a detecting section 50. The detecting section 50 is covered with a jacket material and connected electrically to the circuit board 36. The magnetic sensors 35A and 35B are inserted between the respective pair of nail pieces 342.

The hall element constituting the detecting section 50 utilizes the Hall Effect in which the direction of a current is deflected by a magnetic field so that a voltage is generated in a direction perpendicular to those of the magnetic field and the current.

Referring to FIGS. 1 and 6, the circuit board 36 is adopted to feed power to the magnetic sensors 35A and 35B, perform predetermined signal processing on signals input from the magnetic sensors 35A and 35B, and output the processed signals to the ECU 17. The circuit board 36 has, for example, circuit components and a printed wiring board as assembly members thereof.

Referring to FIGS. 4B and 5, in a neutral state where no torque occurs between the input shaft 22 and the output shaft 23, the leading end of each nail 29b of the magnetic yokes 29A and 29B points the boundary between N and S poles of the permanent magnet 28. In this case, since the areas facing the N and S poles of the permanent magnet 28 are the same in each nail 29b of the magnetic yokes 29A and 29B, the number of magnetic fluxes entering the N pole is equal to that appearing at the S pole, resulting in that no magnetic fluxes occur between the pair of magnetic yokes 29A and 29B. Therefore, the magnetic sensors 35A and 35B detect no magnetic fluxes.

Referring to FIGS. 4A and 5, when torque occurs in one direction between the input shaft 22 and the output shaft 23, torsion occurs on the torsion bar 24 and the relative position between the nails 29b of the pair of magnetic yokes 29A and 29B and the permanent magnet 28 varies.

In this case, the area facing the N pole of the permanent magnet 28 in each nail 29b of one magnetic yoke 29A is greater than that facing the S pole of the permanent magnet 28, and thereby in the one magnetic yoke 29A, the number of magnetic fluxes entering the N pole is greater than that appearing at the S pole. Meanwhile, the area facing the N pole of the permanent magnet 28 in each nail 29b of the other magnetic yoke 29B is smaller than that facing the S pole of the permanent magnet 28, and thereby in the other magnetic yoke 29B, the number of magnetic fluxes entering the N pole is smaller than that appearing at the S pole.

The magnetic fluxes generated at the magnetic yokes 29A and 29B are induced by the respective magnetic flux collector rings 34A and 34B. As a result, magnetic fluxes are generated from the nail pieces 342 on the magnetic flux collector ring 34A corresponding to the one magnetic yoke 29A to the nail pieces 342 on the magnetic flux collector ring 34B corresponding to the other magnetic yoke 29B. These magnetic fluxes are detected by the magnetic sensors 35A and 35B.

Meanwhile, referring to FIGS. 4C and 5, when torque occurs in the other direction between the input shaft 22 and the output shaft 23, the relative position between the nails 29b of the pair of magnetic yokes 29A and 29B and the permanent magnet 28 varies in the direction inverse to the above case where torque occurs in the one direction to result in that inverse magnetic fluxes occur at the respective magnetic yokes 29A and 29B. As a result, magnetic fluxes are generated from the nail pieces 342 on the magnetic flux collector ring 34B corresponding to the other magnetic yoke 29B to the nail pieces 342 on the magnetic flux collector ring 34A corresponding to the one magnetic yoke 29A, and these magnetic fluxes are to be detected.

Referring to FIGS. 4D and 5, FIG. 4D shows points with references 4A, 4B, and 4C that represent the relationship between the torsional angle of the torsion bar 24 and the magnetic flux density in the respective states shown in FIGS. 4A, 4B, and 4C. Within the actual range of use of the torsional angle of the torsion bar 24, the magnetic flux density between the pair of nail pieces 342 of the pair of magnetic flux collector rings 34A and 34B is proportional to the difference between the areas facing the N and S poles in each nail 29b of the magnetic yokes 29A and 29B, and this difference is proportional to the torsional angle of the torsion bar 24 and therefore the magnitude of the torque occurring between the input shaft 22 and the output shaft 23. That is, the torque can be known based on the detected magnetic flux density. Also, with the magnetic flux collector rings 34A and 34B, the magnetic sensors 35A and 35B can detect the average of the magnetic flux density occurring all around the magnetic yokes 29A and 29B.

Referring to FIGS. 2, 5, and 6, in the present embodiment, the fixing side unit 31 is divided into the first and second units 38 and 39. The first and second units 38 and 39 are formed separately as discrete components and coupled mechanically to each other in the coupling direction RP as well as can be separated as appropriate.

The receiving plate 38a of the first unit 38 has the base 38e as a portion for mounting the magnetic shield plate 37B thereon, a fitting recessed portion 38f surrounded by the base 38e, a pair of recess forming parts 38g protruding from the bottom of the fitting recessed portion 38f, a to-be-attached surface 38h to be attached to the mounting surface 30c of the sensor housing 30, and two screw insertion holes 38i through which the two fixing screws are inserted.

The to-be-attached surface 38h is formed on one surface of the flange 38b, i.e., on the back side of the base 38e, in a rectangularly annular flat shape surrounding the annular portion 38c of the first unit 38 and faces the mounting surface 30c of the sensor housing 30 to be in contact therewith.

The base 38e is formed in an annular flat shape as an end face of the flange 38b and in planar contact with a to-be-attached surface 39h as one surface of the magnetic shield plate 37B.

The screw insertion holes 38*i* penetrate through the to-be-attached surface 38*h* and the base 38*e* and are arranged apart from each other on either side of the fitting recessed portion 38*f*.

The fitting recessed portion 38*f* has a circular inner peripheral surface when viewed in the coupling direction RP. Also, the pair of recess forming parts 38*g* are arranged at the center on the bottom of the fitting recessed portion 38*f*.

The recess forming parts 38*g* each include two nail pieces 342 of the respective magnetic flux collector rings 34A and 34B and a portion of the first synthetic resin 40.

The insertion recessed portion 43 is formed between the pair of recess forming parts 38*g* and between the nail pieces 342 of the magnetic flux collector rings 34A and 34B with a predetermined amount of clearance as well as opened radially outward along the coupling direction RP as an insertion direction.

The end portion 39*a* of the second unit 39 has the to-be-attached surface 39*h* formed in a flat annular shape as an end face of the end portion 39*a* and also as one surface of the magnetic shield plate 37B, a fitting protruding part 39*f* protruding from the end face, an insertion protruding part 44 for magnetic flux detection protruding from the top face of the fitting protruding part 39*f*, and two guidance protruding parts 39*g* protruding on the same side as the insertion protruding part 44. The insertion protruding part 44 includes the pair of magnetic sensors 35A and 35B and a portion of the second synthetic resin 41. The insertion protruding part 44 is arranged between the pair of fixing screws 32.

The fitting protruding part 39*f* is arranged in such a manner as to be surrounded by the to-be-attached surface 39*h*, formed in such a manner as to protrude from the to-be-attached surface 39*h* by a predetermined height, and has a circular shape when viewed in the coupling direction RP. The fitting protruding part 39*f* has a cylindrical outer peripheral surface and a top face. From the top face, the insertion protruding part 44 and the two guidance protruding parts 39*g* protrude in the coupling direction RP.

The two guidance protruding parts 39*g* are arranged nearer the outer periphery on the top face of the fitting protruding part 39*f* and on either side of the insertion protruding part 44 with respect to the axial direction S and extend straight in the coupling direction RP. The relative movement between the first and second units 38 and 39 is guided with the guidance protruding parts 39*g* being in contact with the inner peripheral surface of the fitting recessed portion 38*f*.

The fixing screws 32 each have a head portion 32*a*, an axial portion 32*b* extending from the head portion 32*a* with a diameter smaller than that of the head portion 32*a*, and a male screw portion formed around the leading end of the axial portion 32*b*. The fixing screws 32 are inserted through the screw insertion holes 37*a* in the second unit 39 and the screw insertion holes 38*i* in the first unit 38, and then the male screw portions around the leading ends of the inserted fixing screws 32 are screwed and fitted into the female threads of the screw holes 30*g* in the sensor housing 30.

The flange 38*b* of the receiving plate 38*a* in the first unit 38 is mounted on the mounting surface 30*c* of the sensor housing 30. The to-be-attached surface 39*h* of the second unit 39 is placed along the base 38*e* of the first unit 38 and then the magnetic shield plate 37B of the second unit 39 is threadably mounted on the base 38*e*.

The first unit 38 is held between the mounting surface 30*c* of the sensor housing 30 and the magnetic shield plate 37B of the second unit 39. In this state, the insertion protruding part 44 protrudes from the central portion 37*b* of the magnetic shield plate 37B in the coupling direction RP and is inserted into the insertion recessed portion 43 in such a manner as to hold the magnetic sensors 35A and 35B. One magnetic sensor 35A is arranged between one pair of nail pieces 342, while the other magnetic sensor 35B is arranged between the other pair of nail pieces 342.

The fitting protruding part 39*f* on the end portion 39*a* of the second unit 39 is fitted into the fitting recessed portion 38*f* in the receiving plate 38*a* of the first unit 38. Since the fitting protruding part 39*f* is fitted into the fitting recessed portion 38*f*, the relative movement between the first and second units 38 and 39 is limited with respect to the circumferential and axial directions T and S.

In the torque detector 16 according to the present embodiment, the pair of magnetic flux collector rings 34A and 34B coupled magnetically to the respective magnetic yokes 29A and 29B as soft magnetic bodies are formed by molding with the first synthetic resin 40, and there are provided the first unit 38 to be installed in the sensor housing 30 as an object in which the units are installed and the second unit 39 formed by molding the magnetic sensors 35A and 35B with the second synthetic resin 41.

The first unit 38 includes the insertion recessed portion 43 and the receiving plate 38*a* in which the base 38*e* is formed surrounding the insertion recessed portion 43. The second unit 39 includes the metal magnetic shield plate 37B received by the base 38*e* and the insertion protruding part 44 protruding from the central portion 37*b* of the magnetic shield plate 37B and inserted into the insertion recessed portion 43 in such a manner as to hold the magnetic sensors 35A and 35B.

The receiving plate 38*a* exists between the magnetic shield plate 37B and the sensor housing 30. In this state, the pair of fixing screws 32 are inserted through the respective pair of screw insertion holes 37*a* formed in the magnetic shield plate 37B and then through the respective pair of screw insertion holes 38*i* formed in the receiving plate 38*a* in the first unit 38. The pair of fixing screws 32 are further screwed into the screw holes 30*g* provided in the sensor housing 30, so that the first and second units 38 and 39 are fastened and fixed together to the sensor housing 30.

In accordance with the present embodiment, since the magnetic shield plate 37B and the receiving plate 38*a* are fastened together to the sensor housing 30 using the pair of fixing screws 32, the number of parts can be reduced, resulting in a reduction in production cost. Also, the magnetic shield plate 37B can suppress adverse effect of external magnetism.

Specifically, with the metal magnetic shield plate 37B, the peripheral edge portions of the screw insertion holes 37*a* can receive the head portions 32*a* of the fixing screws 32. It is therefore not necessary to provide additional metal members (not shown in the drawings) for receiving the fixing screws 32 in the second unit 39, resulting in a reduction in production cost.

In addition, the magnetic shield plate 37B is fixed to the second unit 39 when the second synthetic resin 41 in the second unit 39 is molded. In this case, it is not necessary to provide additional members for fixing the magnetic shield plate 37B to the second unit 39, resulting in a reduction in production cost.

Further, the first unit 38 including the magnetic flux collector rings 34A and 34B and the second unit 39 including the magnetic sensors 35A and 35B are formed separately. Accordingly, when it is necessary to replace the magnetic sensors 35A and 35B, for example, it is only required to replace the second unit 39 including the magnetic sensors 35A and 35B without replacing the first unit 38.

This is advantageous for the reason that since the steering shaft 4 is inserted through the first unit 38, it is necessary to disassemble the steering column 7 and pull out the steering shaft 4, which takes a lot of time and effort to replace the first unit 38 in order to replace the first unit. Accordingly, the magnetic sensors 35A and 35B can be replaced economically in a short time. Replacing only the first unit 38 is also economical.

Moreover, the fixing side unit 31 is divided into the first unit 38 including the magnetic flux collector rings 34A and 34B and the second unit 39 including the magnetic sensors 35A and 35B, which increases the degree of freedom of design of the entire torque detector 16, whereby the torque detector 16 can be applied easily to various devices and equipment.

Also, since the magnetic shield plates 37A and 37B are provided, output signals from the magnetic sensors 35A and 35B are made unsusceptible to adverse effects of external magnetism, which can suppress the reduction in the responsitivity of the output signals by a filter for suppressing the adverse effects of such external magnetism if provided. Accordingly, the steering feeling of the electric power steering device 1 can be improved.

Furthermore, the insertion protruding part 44 including the pair of magnetic sensors 35A and 35B is arranged between the pair of guidance protruding parts 39g. This can prevent the magnetic sensors 35A and 35B from being damaged when the first and second units 38 and 39 are assembled, that is, the fitting protruding part 39f is inserted into the fitting recessed portion 38f. This results in a reduction in the defective fraction of products and therefore an improvement in productivity.

Figure 7:
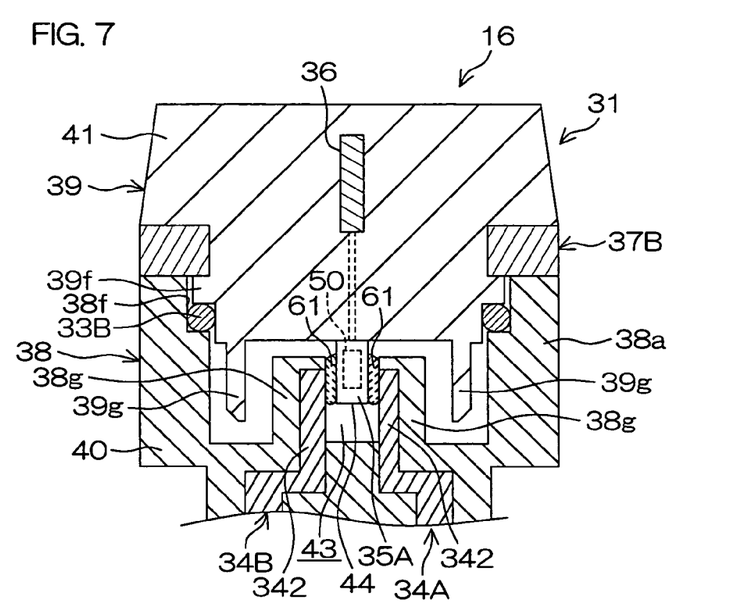
FIG. 7 is an enlarged cross-sectional view of a substantial part of a torque detector according to another embodiment of the present invention.
Figure 8:
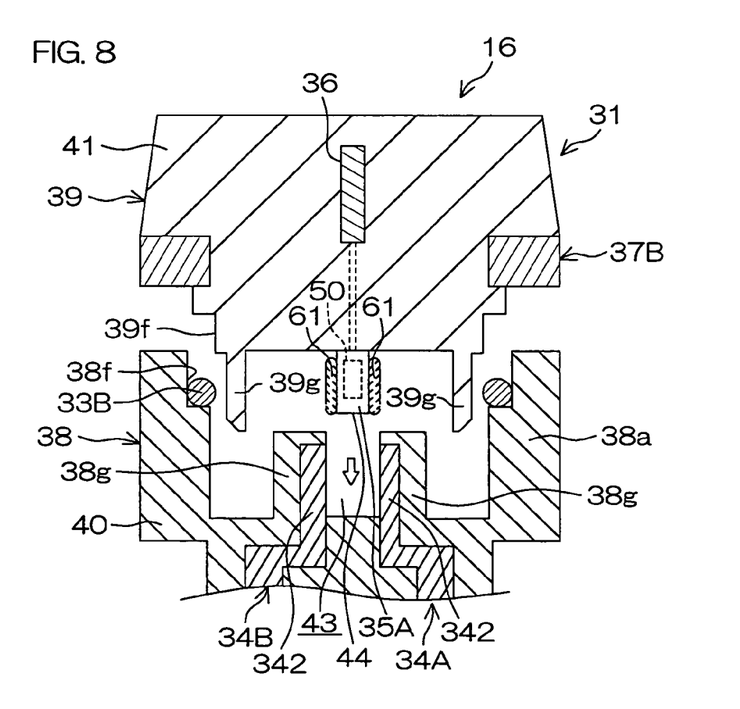
FIG. 8 is a construction drawing of the torque detector in FIG. 7 showing a state before the installation of a magnetic sensor.

Next, FIGS. 7 and 8 show another embodiment of the present invention. In the present embodiment, the magnetic sensor 35A is arranged between a pair of nail pieces 342 as magnetic flux collector bosses, as shown in FIG. 7. Grease 61 as magnetic material exists between the nail pieces 342 and the magnetic sensor 35A. The grease 61 contains, for example, soft magnetic powder such as ferrite powder mixed therein.

Magnetic fluxes collected at the leading ends of the nail pieces 342 are introduced into the magnetic sensor 35A through the magnetic material 61. Since the grease 61 as magnetic material has magnetic properties, the magnetic fluxes collected at the leading ends of the nail pieces 342 can hardly leak circumferentially to pass through the magnetic sensor 35A with which the magnetic material 61 is in contact. As a result, the number of magnetic fluxes that pass through the detecting section 50 increases, which allows for high-precision torque detection.

As shown in FIG. 8, after applying the grease 61 as magnetic material onto both sides of the magnetic sensor 35A, the magnetic sensor 35A can be arranged easily between the pair of nail pieces 342 by inserting the fitting protruding part 39f in the second unit 39 into the fitting recessed portion 38f in the first unit 38 as indicated by the outlined arrow. That is, after applying the grease 61 onto the magnetic sensor 35A, the magnetic sensor 35A can be assembled easily between the pair of nail pieces 342 by fitting the second unit 39 to the first unit 38.

Figure 9:
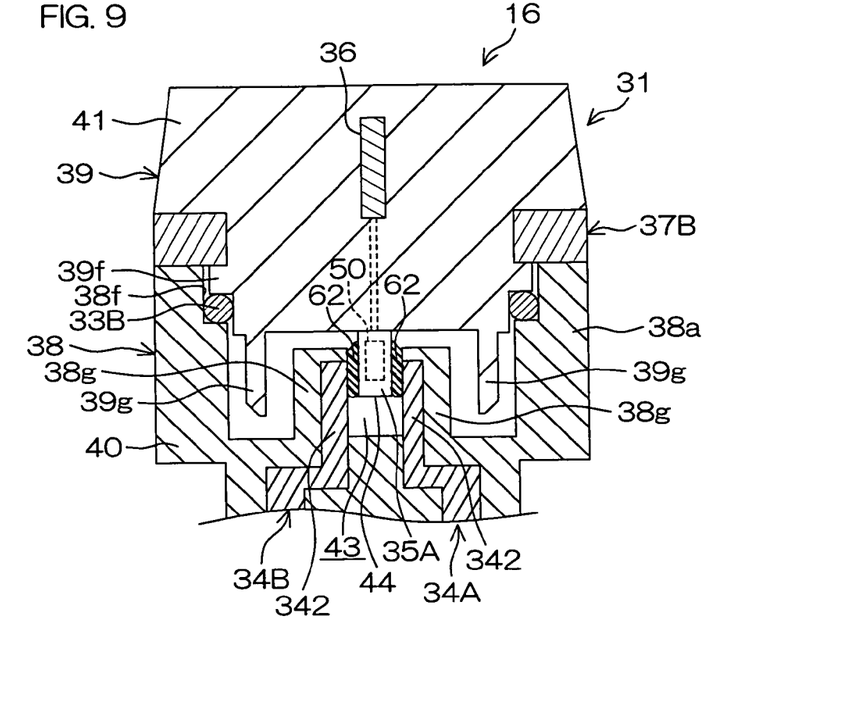
FIG. 9 is an enlarged view of a substantial part of a torque detector according to still another embodiment of the present invention.

As shown in FIG. 9, hardening resin 62 with soft magnetic powder such as ferrite powder mixed therein may also be used as magnetic material. In this case, after fitting the second unit 39 to the first unit 38, the hardening resin 62 is hardened by application of heat or exposure to ultraviolet radiation. In the embodiment shown in FIG. 9, the hardening resin 62 as magnetic material can be held reliably between the nail pieces 342 and the magnetic sensor 35A even under an environment of usage subject to high temperature or vibrations. It is therefore possible to detect torque stably with high precision.

Figure 10:
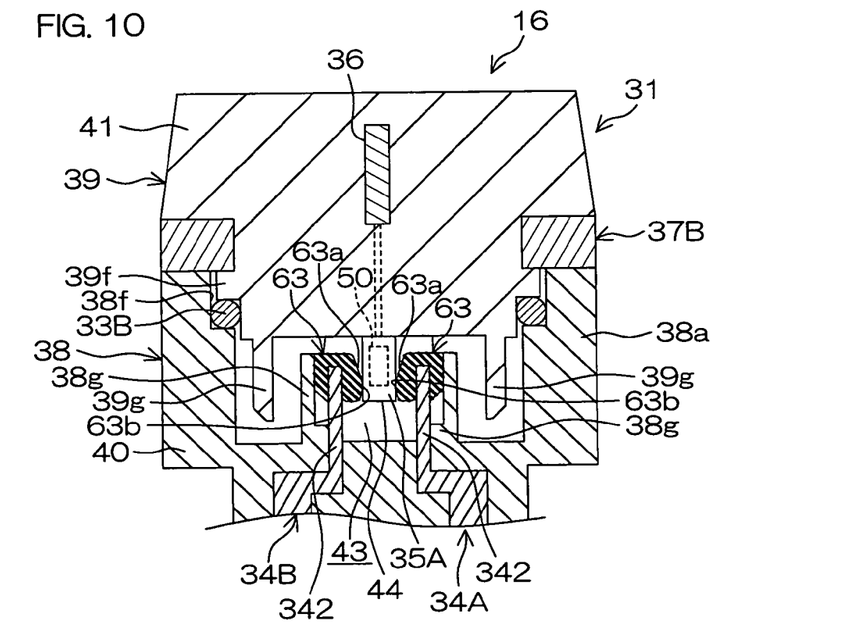
FIG. 10 is an enlarged view of a substantial part of a torque detector according to a further embodiment of the present invention.

Next, FIG. 10 shows a further embodiment of the present invention. In the present embodiment, a pair of magnetic rubber bodies 63 are used as magnetic material. The magnetic rubber bodies 63 include ones containing magnetic powder or iron powder with an insulator coated surface. The rubber bodies 63 are fitted to the leading ends of the respective nail pieces 342.

The opposed faces of the pair of rubber bodies 63 on either side of the magnetic sensor 35A include tapered faces 63a slanted in opposite directions. The tapered faces 63a of the pair of rubber bodies 63 come close to each other along the insertion direction of the magnetic sensor 35A. The magnetic sensor 35A is guided by the tapered faces 63a to be inserted between the rubber bodies 63 as magnetic material. Since the magnetic sensor 35A is held elastically between the projecting portions 63b where the pair of rubber bodies 63 come closest to each other, the magnetic sensor 35A is assembled between the pair of nail pieces 342.

In the present embodiment, if the position of the detecting section 50 in the magnetic sensor 35A is fitted to the positions of the projecting portions 63b of the pair of rubber bodies 63 as magnetic material, magnetic fluxes collected at the projecting portions 63b of the magnetic rubber bodies 63 through the leading ends of the nail pieces 342 are concentrated at the detecting section 50. As a result, the number of magnetic fluxes that pass through the detecting section 50 further increases, which allows for higher precision torque detection.

Also, since elastic rubber bodies are used as magnetic material, the assembling of the magnetic sensor 35A with the rubber bodies 63 as magnetic material existing therearound can be achieved easily by inserting the magnetic sensor 35A between the pair of rubber bodies 63 as magnetic material. It is also easy to dismount the magnetic sensor 35A.

In the above-described embodiments, the following exemplary variations may be adopted.

For example, the fixing screws 32 may penetrate through the sensor housing 30 to be screwed and fitted into nuts. The permanent magnet 28 may be fixed to the output shaft 23, while the pair of magnetic yokes 29A and 29B may be fixed to the input shaft 22.

The torque detector 16 and the electric motor 18 as a drive source may be provided in the steering mechanism 5, although provided in the steering column 7.

Although the present invention has heretofore been described in detail based on specific aspects, various modifications, improvements, and equivalents thereof will readily occur to those skilled in the art who understand the foregoing descriptions. Therefore, the present invention should cover the scope of claims and equivalents thereof.

This application claims the benefit of Japanese Published Unexamined Patent Application No. 2007-087971 filed with the Japan Patent Office on Mar. 29, 2007 and Japanese Patent Application No. 2007-093386 filed with the Japan Patent Office on Mar. 30, 2007, the disclosure of which is incorporated herein by reference in its entirety.

What is claimed is:

1. A torque detector for detecting torque through detection of a magnetic flux variation that occurs in a pair of soft magnetic bodies arranged within the magnetic field of a permanent magnet, the torque detector comprising:
   first and second units;
   a pair of fixing screws that fasten the first and second units to an object in which the units are installed, wherein
   the first unit includes a pair of magnetic flux collector rings coupled magnetically to the respective pair of soft magnetic bodies and a first synthetic resin formed by molding the pair of magnetic flux collector rings, the second unit includes a magnetic shield plate containing metal, a second synthetic resin fixed to the magnetic shield plate, an insertion protruding part arranged on a portion of the second synthetic resin in such a manner as to protrude from the magnetic shield plate, and a magnetic sensor held within the insertion protruding part, the first synthetic resin includes a receiving plate on which a base for receiving the magnetic shield plate is formed, and the pair of magnetic flux collector rings include at least one pair of magnetic flux collector bosses arranged in such a manner as to face each other, the magnetic sensor held within the insertion protruding part is disposed in an insertion recessed portion formed between the magnetic flux collector bosses, the pair of fixing screws are spaced from each other, the insertion protruding part is arranged between the pair of fixing screws, and wherein in a state where the receiving plate exists between the magnetic shield plate and the object in which the units are installed, the magnetic shield plate and the receiving plate are fastened together to the object in which the units are installed using the pair of fixing screws.

2. The torque detector according to claim 1, wherein the pair of fixing screws are screwed respectively into screw holes in the object in which the units are installed through respective screw insertion holes formed in the magnetic shield plate and respective screw insertion holes formed in the receiving plate.

3. The torque detector according to claim 1, wherein the pair of fixing screws each have a head portion, and wherein the head portions of the respective pair of fixing screws are received on the magnetic shield plate.

4. The torque detector according to claim 1, wherein the magnetic shield plate is fixed to the second synthetic resin as a result of an injection molding process for the second synthetic resin.

5. The torque detector according to claim 1, wherein the second unit further includes a guidance protruding part for guiding fitting of the second unit to the first unit, and wherein the insertion protruding part and the guidance protruding part protrude in the same direction.

6. The torque detector according to claim 1, wherein a magnetic material exists between the magnetic flux collector bosses and the magnetic sensor.

7. The torque detector according to claim 6, wherein the magnetic material contains grease with magnetic powder mixed therein.

8. The torque detector according to claim 6, wherein the magnetic material contains hardening resin with magnetic powder mixed therein.

9. The torque detector according to claim 6, wherein the magnetic material contains a plurality of rubber bodies with magnetic powder mixed therein, and wherein the rubber bodies are fitted to the corresponding magnetic flux collector bosses and in elastic contact with the magnetic sensor.

* * * * *